United States Patent [19]

Batteas et al.

[11] Patent Number: 4,628,714

[45] Date of Patent: Dec. 16, 1986

[54] VEHICLE WHEEL LOCK

[76] Inventors: Elmer L. Batteas, Rte. 1, Box 150A, Brownwood; Donald W. Hamlett, 127 Gorman St., Early, both of Tex. 76801

[21] Appl. No.: 675,961

[22] Filed: Nov. 28, 1984

[51] Int. Cl.[4] ............................................. B62H 5/14
[52] U.S. Cl. ...................................... 70/226; 70/228; 70/223
[58] Field of Search .................. 70/225, 226, 228, 222, 70/223, 171, 259

[56] References Cited

U.S. PATENT DOCUMENTS

| | | | |
|---|---|---|---|
| 1,361,756 | 12/1920 | Egbert | 70/226 |
| 1,426,666 | 8/1922 | Palmer | 70/259 |
| 1,859,130 | 5/1932 | Dant | 70/226 |

FOREIGN PATENT DOCUMENTS 31438   11/1926   France .................. 70/259

*Primary Examiner*—Robert L. Wolfe
*Attorney, Agent, or Firm*—Hubbard, Thurman, Turner & Tucker

[57] ABSTRACT

Disclosed is a vehicle wheel lock which includes a spindle having an axial passage therein. A hub is rotatably mounted on the spindle and has formed therein an internal socket. A locking member is nonrotatably but axially moveably mounted on the spindle. The locking member is configured to nonrotatably engage the socket of the hub and is moveable from an unlocked position out of engagement with the socket to a locked position in engagement with the socket. A spring is provided for urging the locking member toward the locked position. A lock assembly is provided for moving the locking member toward the unlocked position. The lock assembly includes a key operable lock which includes a lock body and a rotating member that is key operable to rotate with respect to the lock body. A first screw threaded member is connected to the rotating member of the lock and a second screw threaded member is threadedly engaged with the first screw threaded member. The second screw threaded member is nonrotatable with respect to the spindle and is arranged to transmit force to the locking member.

10 Claims, 3 Drawing Figures

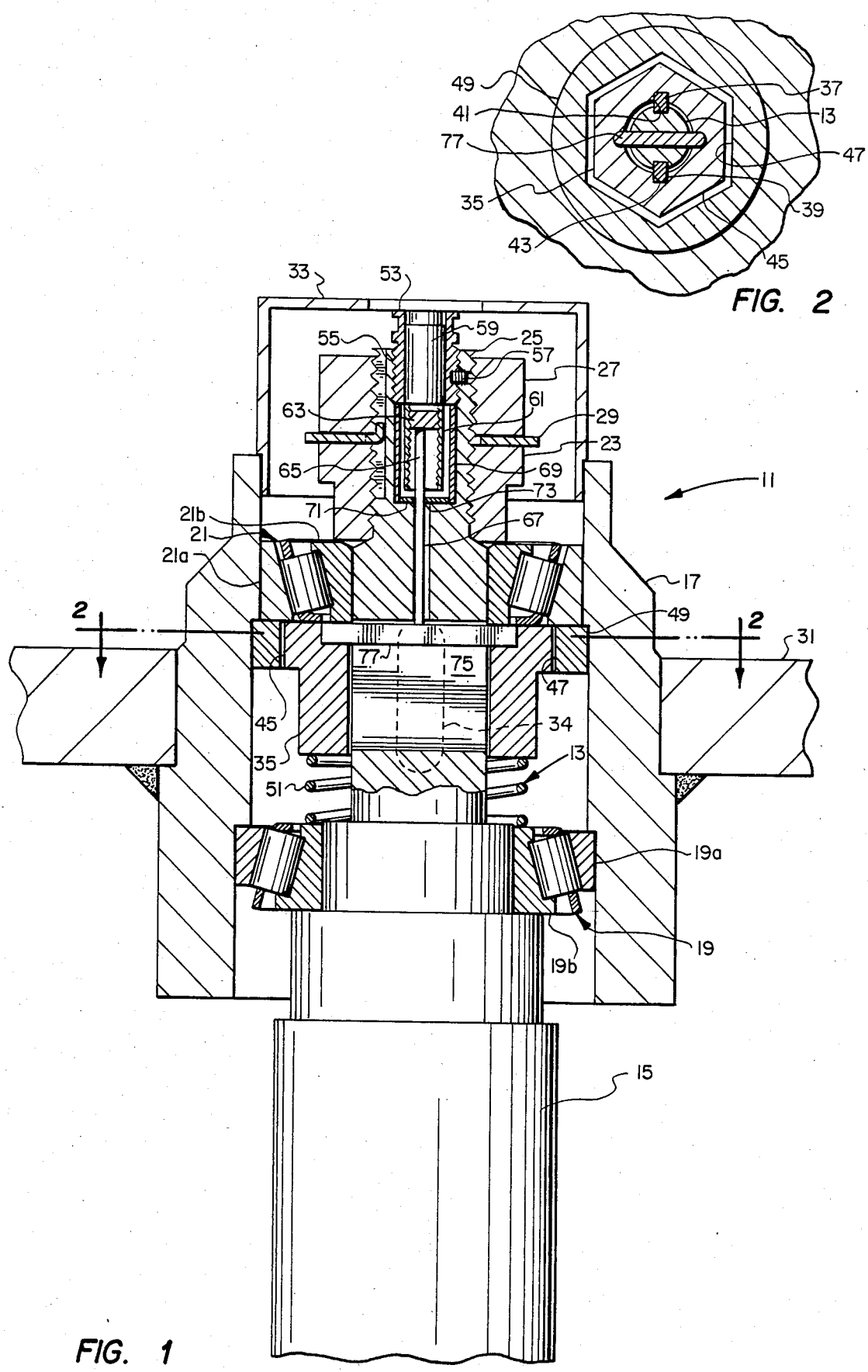

VEHICLE WHEEL LOCK

BACKGROUND OF THE INVENTION

1. Field of the Invention

The present invention relates generally to locking devices and more particularly to a locking device for the wheel of a vehicle, as for example a trailer.

2. Description of the Prior Art

The theft of personal property is a problem as old as mankind. Modern thieves are particularly attracted to wheeled vehicles in that they typically are of substantial value and are easily transportable. For example, trailers may carry boats, or other valuable items, and since they are on wheels, they can be simply and quickly hooked up to a truck or automobile and towed away.

The usual method for safeguarding wheeled vehicles, such as trailers from theft is to chain the vehicle to a post or other substantially immovable object. However, a professional thief equipped with bolt cutters can unchain a trailer in a matter of seconds. A more satisfactory method of vehicle theft prevention would involve locking the vehicle wheels. There have been proposed a number of vehicle wheel blocks. Examples of such vehicle wheel locks are disclosed in Watson U.S. Pat. No. 1,488,081, Beck U.S. Pat. No. 648,912, O'Brien U.S. Pat. No. 1,359,419, Schnaars U.S. Pat. No. 1,434,156, Egbert U.S. Pat. No. 1,361,756, and Pichl U.S. Pat. No. 1,365,949. None of the foregoing locking mechanisms has been entirely satisfactory.

It is therefore an object of the present invention to provide a vehicle wheel lock that overcomes the shortcomings of the prior art. More particularly, it is an object of the present invention to provide a relatively simple key operated vehicle lock that does not require substantial modification of a standard hub and spindle vehicle axle arrangement. It is a further object of the present invention to provide a vehicle wheel lock that is substantially foolproof in that if the key operable lock is removed, the remaining locking mechanism will move to the locked position.

SUMMARY OF THE INVENTION

Briefly stated, the foregoing and other objects are accomplished by the present invention. The wheel lock includes a spindle which has an axial passage formed therein. A hub is rotatably mounted on the spindle by bearings or the like. The hub has formed therein an internal socket. A locking member is nonrotatably mounted on the spindle. The locking member is axially movable on the spindle between a locked position in engagement with the socket and an unlocked position out of engagement with the socket. A spring is provided for urging the locking member toward the unlocked position. A lock assembly is provided for moving the locking member toward the unlocked position.

The lock assembly includes a key operable lock, which includes a lock body mounted in the spindle passage and a rotating member mounted within the lock body. The rotating member is key operable to rotate with respect to the lock body, and accordingly with respect to the spindle. A first screw threaded member is positioned in the spindle passage and is connected to and rotatable with the rotating member of the key operable lock. A second screw threaded member is threadedly engaged with the first screw threaded member. The screw threaded member includes an operator rod which is axially movably but nonrotatably mounted in the spindle. Thus, rotation of the first screw threaded member by the action of the key operable lock causes axial movement of the second screw threaded member and operator rod. The operator rod is operably connected to the locking member to move it to its unlocked position.

BRIEF DESCRIPTION OF THE DRAWINGS

FIG. 1 is a partial sectional view of the preferred embodiment of the vehicle wheel lock of the present invention in its locked position.

FIG. 2 is a partial sectional view taken along line 2—2 of FIG. 1.

DESCRIPTION OF THE PREFERRED EMBODIMENT

Figure 3:
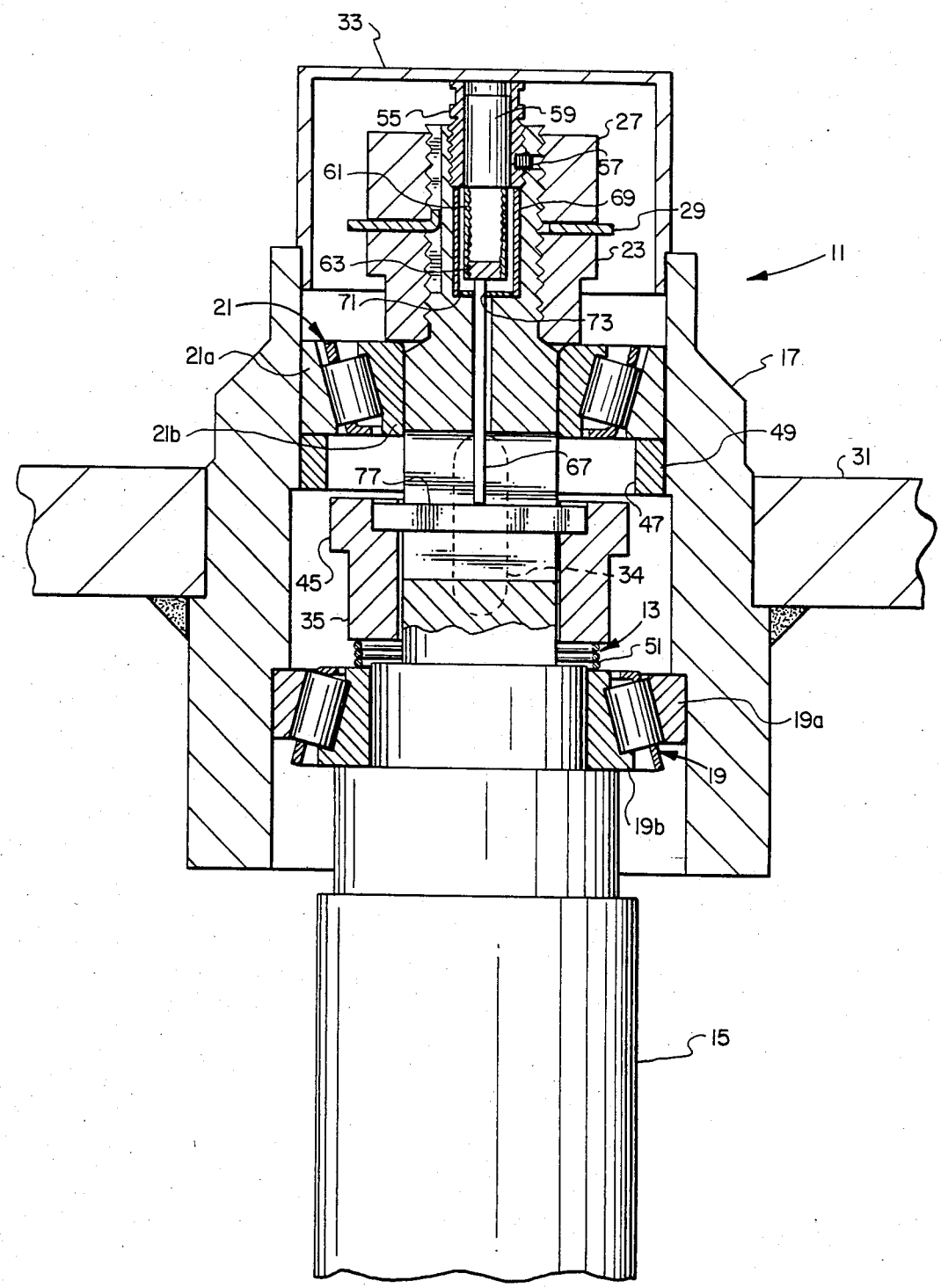
FIG. 3 is a partial sectional view of the preferred embodiment of the vehicle wheel lock of the present invention in the unlocked position.

Referring now to the drawings, and first to FIG. 1, the vehicle wheel lock of the present invention is designated generally by the numeral 11. Vehicle wheel lock 11 is preferably adapted for use with nonself-propelled vehicles, such as trailers, but may be used on such self-propelled vehicles as trucks, automobiles, or the like.

Vehicle wheel lock 11 includes a spindle, designated generally by the numeral 13. Spindle 13 is preferably formed at the end of an axle 15, which is nonrotatingly affixed to the vehicle. A hub 17 is rotatably mounted on spindle 13, preferably between axially spaced apart bearings 19 and 21. Preferably, bearing 19 is a roller bearing assembly including an outer race 19a press fitted into hub 17 and an inner race 19b carried by spindle 13. Similarly, bearing 21 is preferably a roller bearing assembly including an outer race 21a press fitted into hub 17 and an inner race 21b carried by spindle 13.

Hub 17 is retained on spindle 13 by a nut 23 which is threaded onto the externally threaded outer end 25 of spindle 13. A lock nut 27 and lock washer 29 are provided to prevent nut 23 from backing off spindle 13. Bearings 19 and 21 are preferably greased and suitable seals may be provided for retaining grease within hub 17. Hub 17 includes an annular flange 31 to which a wheel (not shown) may be mounted in any conventional manner. A cap 33 may be provided to protect the outer end of spindle 13.

Vehicle wheel lock 11 includes means for preventing rotation of hub 17 with respect to 13, thereby to lock the wheel. Such means includes a locking member 35 positioned on spindle 13 between bearings 19 and 21. Referring particularly to FIG. 2, locking member 35 is splined or keyed to spindle 13 by lugs 37 and 39. Lugs 37 and 39 extend radially outwardly from spindle 13 and are immovable with respect thereto. Locking member 35 includes diametrically opposed channels 41 and 43 which slidingly engage lugs 37 and 39, respectively. Locking member 35 is thus nonrotatable with respect to spindle 13 but is axially slidable on spindle 13 between a locked position, as shown in FIG. 1, and an unlocked position as shown in FIG. 3.

The upper end 45 of locking member 35 has a nonround configuration including at least one flat side, and in the preferred embodiment is hexagonal. Hub 17 includes a socket 47 which is configured to nonrotatingly mate with upper portion 45 of locking member 35. Thus, in the preferred embodiment, socket 47 is also of hexagonal configuration. Socket 47 may be formed in hub 17 by machining. However, in the embodiment described, socket 47 is formed in a ring 49 that is pressed into hub 17. When upper portion 45 of locking member 35 is engaged with socket 47, as shown in FIG. 1, hub 17 is nonrotatably locked with respect to spindle 13. A spring 51 is provided for urging locking member 35 axially toward socket 47.

Vehicle wheel lock 11 includes means for urging and holding locking member 35 out of engagement with socket 47, as shown in FIG. 3. Such means includes a key operable lock 53 that is mounted in an axially extending passage in spindle 13. Lock 53 is a commercially available lock, which in the preferred embodiment is manufactured by the Van Lock Company of Cincinnati, Ohio. Lock 53 includes a lock body 55 which is threaded into the end of spindle 13. A set screw 57 may be provided to prevent lock 53 from being removed from spindle 13 when lock nut 27 is in place. Lock 53 also includes a rotating member 59 mounted within lock body 55. Rotating member 59 includes key operable locking structures which normally prevent rotation of rotating member 59 with respect to lock body 55. However, when an appropriate key (not shown) is applied to lock 53, the locking structures permit rotation of rotating member 59 with respect to lock body 55. There are a number of suitable locks available, but the preferred lock is the one by Van.

A first screw threaded member 61 is connected to rotating member 59. In the preferred embodiment, first screw threaded member is an internally threaded cylinder that is connected, by solder or the like to rotating member 59 to be rotatable therewith. A second screw threaded member 6 is engaged with first screw threaded member 61. In the preferred embodiment, second screw threaded member 63 is an externally threaded body positioned in and threadedly engaged with the internally threaded cylinder of first screw threaded member 61.

An operator rod 65 is connected to second screw threaded member 63 and extends axially through the passage end spindle 13. Operator rod 65 may be formed integrally with second screw threaded member 63 or may be attached by solder or the like. In any event, operator rod 65 is nonrotatable with respect to second screw threaded member 63.

Operator rod 65 is nonrotatable with respect to spindle 13. In the preferred embodiment, operator rod 65 is made nonrotatable by providing it with at least one flat side 67. An outer cylinder 69 is connected by solder or the like to lock body 55 and includes an end cap 71. End cap includes an aperature 73 which includes a flat side that cooperates with flat side 67 of operator rod 65, thereby to prevent rotation of operator rod 65 with respect to spindle 13.

Rotation of rotating member 59 of key operable lock 53 causes axial movement of second rotating member 63 and operator 65 inwardly and outwardly with respect to spindle 13. Spindle 13 includes a diametrically extending passage 75 which has mounted therein a cross piece 77. Cross piece 77 extends across passage 75 into engagement at either of its ends with locking member 35. The axially inner end of operator rod 65 engages cross piece 77 and transmits axially inwardly directed unlocking forces to locking member 35.

In operation, when it is desired to unlock vehicle wheel lock 11, an appropriate key is inserted into key operable lock 53 and rotated. The rotation of the key causes rotation of rotating member 59 of lock 53, which in turn causes rotation of first screw threaded member 61. The rotation of first screw threaded member 61 causes axial movement of second screw threaded member 63 and operator rod 65. The axial movement of operator rod 65 is transmitted through cross piece 77 to move locking member 35 axially to the position shown in FIG. 3, thereby to unlock vehicle wheel lock 11. With locking member 35 in the position shown in FIG. 3, hub 17 is free to rotate on spindle 13.

When it is desired to lock vehicle wheel lock 11, the key is again inserted into key operable lock 53 and rotated, thereby to move second rotating member 63 and operator rod axially outwardly. Spring 51 provides the force to urge locking member 35 into engagement with socket 47. If hexagonal upper portion 45 of locking member 35 does not line up immediately with socket 47, it will snap into engagement if hub 17 is rotated something less than 60°. It will also be noted, that if a thief attempts to defeat vehicle wheel lock 11 by removing key operable lock 53, spring 51 will urge locking member 35 into locking engagement with socket 47.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A vehicle wheel lock, which comprises:
   a spindle having an axial passage formed therein;
   a hub rotatably mounted on said spindle, said hub having formed therein an internal socket having at least one flat side;
   a locking member nonrotatably mounted on said spindle within said hub, said locking member being nonrotatably engageable with said socket of said hub, said locking member being axially movable on said spindle between a locked position in engagement with said socket and an unlocked position with said locking member out of engagement with said socket;
   spring means for urging said locking member toward said locked position;
   and lock means for moving said locking member toward said unlocked position, said lock means including;
   (a) a key-operable lock including a lock body mounted in said spindle passage and a rotating member mounted within said lock body, said rotating member being key-operable to rotate with respect to said lock body;
   (b) a first screw-threaded member in said spindle passage connected to and rotatable with said rotating member of said key-operable lock; and,
   (c) a second screw-threaded member threadedly engaged with said first screw-threaded member, said second screw-threaded member including an operator rod axially movably and nonrotatably mounted in said spindle passage to transmit force to said locking member to urge said locking member toward said unlocked position.

2. The vehicle wheel lock as claimed in claim 1, wherein:
said first screw-threaded member includes an internally threaded cylinder affixed to said rotating member of said key-operable lock;
said second-screw threaded member includes an externally threaded body threadedly engaged with said internally threaded cylinder;
and said operator rod is connected to said externally threaded body and includes at least one axially extending flat surface.

3. The vehicle wheel lock as claimed in claim 2, wherein said key-operable lock includes an outer cylinder mounted about said internally threaded cylinder and affixed to said lock body and an end cap affixed to said outer cylinder, said end cap having an aperture formed therein, said aperture having at least one flat side cooperating with the at least one flat side of said operator rod to prevent rotation of said operator rod with respect to said spindle.

4. The vehicle wheel lock as claimed in claim 1, wherein said spindle has an axially outer end and said spring means is arranged to urge said locking member toward said axial outer end.

5. A vehicle wheel lock, which comprises:
a spindle;
a hub rotatably mounted on said spindle;
a locking member nonrotatably mounted on said spindle, said locking member being movable between a locked position in engagement with said hub and an unlocked position out of engagement with said hub;
spring means for urging said locking member to one of said locked and unlocked positions;
and key-operable means for urging said locking member to the other one of said locked and unlocked positions, said key operable means including a key-operable lock including a lock body non-rotatably mounted to said spindle and a rotating member, said rotating member being key-operable to rotate with respect to said lock body, an operator rod axially movably mounted with respect to said spindle for transmitting axial forces to said locking member, and screw thread means for converting rotation of said rotating member into axial movement of said operator rod.

6. The vehicle wheel lock as claimed in claim 5, wherein:
said hub includes an internal socket and said locking member nonrotatably engages said socket in said locked position.

7. The vehicle wheel lock as claimed in claim 6, wherein:
said spring means is arranged to urge said locking member into said socket.

8. The vehicle wheel lock as claimed in claim 5, wherein said means for converting rotation of said rotating member into axial movement of said operator rod includes:
a first screw threaded member connected to and rotatable with said rotating member of said key-operable lock;
a second screw threaded member non-rotatably connected to said operator rod and threadedly engaged with said first screw member;
and means for preventing rotation of said operator rod with respect to said spindle, whereby rotation of said rotating member of said key-operable lock cause axial movement of said operator rod.

9. The vehicle wheel lock as claimed in claim 8, wherein:
said first screw-threaded member includes an internally threaded cylinder affixed to said rotating member of said key-operable lock;
said second screw-threaded member includes an externally threaded body threadedly engaged with said internally threaded cylinder;
said operator rod is connected to said externally threaded body and includes at least one axially extending flat surface.

10. The vehicle wheel lock as claimed in claim 9, wherein said means for preventing rotation of said operator rod includes outer cylinder mounted about said internally threaded cylinder and affixed to said lock body and an end cap affixed to said outer cylinder, said end cap having an aperture formed therein, said aperture having at least one flat side cooperating with the at least one flat side of said operator rod to prevent rotation of said operator rod with respect to said spindle.

* * * * *